United States Patent
Danilov et al.

(10) Patent No.: US 10,761,743 B1
(45) Date of Patent: Sep. 1, 2020

(54) ESTABLISHING DATA RELIABILITY GROUPS WITHIN A GEOGRAPHICALLY DISTRIBUTED DATA STORAGE ENVIRONMENT

(71) Applicant: EMC IP Holding Company LLC, Hopkinton, MA (US)

(72) Inventors: Mikhail Danilov, Saint Petersburg (RU); Gregory Skripko, Seattle, WA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 59 days.

(21) Appl. No.: 15/651,504

(22) Filed: Jul. 17, 2017

(51) Int. Cl.
  *G06F 12/02* (2006.01)
  *G06F 3/06* (2006.01)

(52) U.S. Cl.
  CPC .......... *G06F 3/0619* (2013.01); *G06F 3/065* (2013.01); *G06F 3/067* (2013.01); *G06F 3/0644* (2013.01)

(58) Field of Classification Search
  CPC combination set(s) only.
  See application file for complete search history.

(56) References Cited

U.S. PATENT DOCUMENTS

| | | | |
|---|---|---|---|
| 5,675,802 A * | 10/1997 | Allen | G06F 8/71 717/103 |
| 5,805,788 A | 9/1998 | Johnson | |
| 7,389,393 B1 | 6/2008 | Karr et al. | |
| 8,370,542 B2 | 2/2013 | Lu et al. | |
| 8,495,465 B1 | 7/2013 | Anholt et al. | |
| 8,832,234 B1 | 9/2014 | Brooker et al. | |
| 8,972,478 B1 | 3/2015 | Storer et al. | |
| 9,063,838 B1 | 6/2015 | Boyle et al. | |
| 9,477,682 B1 | 10/2016 | Bent et al. | |
| 9,641,615 B1 | 5/2017 | Robins et al. | |
| 10,055,145 B1 | 8/2018 | Danilov et al. | |
| 10,361,810 B2 | 7/2019 | Myung et al. | |
| 10,503,611 B1 | 12/2019 | Srivastav et al. | |
| 2002/0166026 A1 | 11/2002 | Ulrich et al. | |
| 2005/0088318 A1 | 4/2005 | Liu et al. | |
| 2005/0140529 A1 | 6/2005 | Choi et al. | |
| 2006/0047896 A1 | 3/2006 | Nguyen et al. | |
| 2006/0075007 A1 | 4/2006 | Anderson et al. | |
| 2006/0143508 A1 | 6/2006 | Mochizuki et al. | |
| 2007/0239759 A1 | 10/2007 | Shen et al. | |
| 2007/0250674 A1 | 10/2007 | Findberg et al. | |
| 2008/0320061 A1 | 12/2008 | Aszmann et al. | |

(Continued)

OTHER PUBLICATIONS

Non-Final Office Action received for U.S. Appl. No. 15/662,273 dated Nov. 16, 2018, 19 pages.

(Continued)

*Primary Examiner* — Yong J Choe
(74) *Attorney, Agent, or Firm* — Amin, Turocy & Watson, LLP

(57) ABSTRACT

Establishing data reliability groups within a geographically distributed data storage environment is presented herein. A system can comprise a processor; and a memory that stores executable instructions that, when executed by the processor, facilitate performance of operations, comprising: partitioning geographically distributed data storage zones into reliability groups, in which a reliability group of the reliability groups comprises a group of storage zones comprising a defined amount of the geographically distributed data storage zones; and facilitating a replication of data of the group of storage zones using a portion of remaining data of the group of storage zones.

20 Claims, 16 Drawing Sheets

(56) References Cited

U.S. PATENT DOCUMENTS

| | | | |
|---|---|---|---|
| 2009/0259882 A1* | 10/2009 | Shellhamer | G06F 11/1076 714/6.32 |
| 2010/0031060 A1 | 2/2010 | Chew et al. | |
| 2010/0218037 A1 | 8/2010 | Swartz et al. | |
| 2010/0332748 A1 | 12/2010 | Van der Goot et al. | |
| 2011/0138148 A1 | 6/2011 | Friedman et al. | |
| 2011/0196833 A1 | 8/2011 | Drobychev et al. | |
| 2011/0246503 A1 | 10/2011 | Bender et al. | |
| 2012/0023291 A1 | 1/2012 | Zeng et al. | |
| 2012/0191901 A1 | 7/2012 | Norair | |
| 2012/0204077 A1 | 8/2012 | D'Abreu et al. | |
| 2012/0317234 A1 | 12/2012 | Bohrer et al. | |
| 2012/0321052 A1 | 12/2012 | Morrill et al. | |
| 2013/0054822 A1 | 2/2013 | Mordani et al. | |
| 2013/0088501 A1 | 4/2013 | Fell | |
| 2013/0097470 A1 | 4/2013 | Hwang et al. | |
| 2013/0246876 A1 | 9/2013 | Manssour et al. | |
| 2014/0064048 A1 | 3/2014 | Cohen et al. | |
| 2014/0280375 A1 | 9/2014 | Rawson et al. | |
| 2014/0297955 A1 | 10/2014 | Yamazaki et al. | |
| 2014/0380088 A1 | 12/2014 | Bennett et al. | |
| 2014/0380125 A1 | 12/2014 | Calder et al. | |
| 2015/0370656 A1 | 12/2015 | Tsafrir et al. | |
| 2016/0011935 A1 | 1/2016 | Luby | |
| 2016/0011936 A1 | 1/2016 | Luby | |
| 2016/0055054 A1 | 2/2016 | Patterson, III et al. | |
| 2016/0162378 A1 | 6/2016 | Garlapati et al. | |
| 2016/0328295 A1 | 11/2016 | Baptist et al. | |
| 2016/0357649 A1 | 12/2016 | Karrotu et al. | |
| 2016/0371145 A1 | 12/2016 | Akutsu et al. | |
| 2016/0380650 A1 | 12/2016 | Calder et al. | |
| 2017/0003880 A1 | 1/2017 | Fisher et al. | |
| 2017/0097875 A1 | 4/2017 | Jess et al. | |
| 2017/0102993 A1 | 4/2017 | Hu et al. | |
| 2017/0206025 A1 | 7/2017 | Viswanathan | |
| 2017/0206135 A1 | 7/2017 | Zeng | |
| 2017/0262187 A1 | 9/2017 | Manzanares et al. | |
| 2018/0063213 A1 | 3/2018 | Bevilacqua-Linn et al. | |
| 2018/0129417 A1 | 5/2018 | Sivasubramanian et al. | |
| 2018/0181324 A1 | 6/2018 | Daniliv et al. | |
| 2018/0181612 A1 | 6/2018 | Daniliv et al. | |
| 2018/0267856 A1 | 9/2018 | Hayasaka et al. | |
| 2018/0306600 A1 | 10/2018 | Nicolaas et al. | |
| 2018/0341662 A1 | 11/2018 | He | |
| 2019/0028179 A1 | 1/2019 | Kalhan | |
| 2019/0043201 A1 | 2/2019 | Strong et al. | |
| 2019/0043351 A1 | 2/2019 | Yang et al. | |
| 2019/0065310 A1 | 2/2019 | Rozas | |
| 2019/0205437 A1 | 7/2019 | Larson et al. | |
| 2019/0384500 A1 | 12/2019 | Danilov et al. | |
| 2019/0386683 A1 | 12/2019 | Danilov et al. | |

OTHER PUBLICATIONS

Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Non-Final Office Action received for U.S. Appl. No. 15/794,950 dated Jul. 9, 2019, 29 pages.
Non-Final Office Action received for U.S. Appl. No. 15/952,179 dated Sep. 10, 2019, 42 pages.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Wikipedia, "Standard Raid Levels—RAID 6", URL: https://en.wikipedia.org/wiki/Standard_RAID_levels#RAID_6", Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non-Final Office Action received for U.S. Appl. No. 16/177, 278 dated Dec. 2, 2019, 55 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.

* cited by examiner

ESTABLISHING DATA RELIABILITY GROUPS WITHIN A GEOGRAPHICALLY DISTRIBUTED DATA STORAGE ENVIRONMENT

TECHNICAL FIELD

The subject disclosure generally relates to embodiments for establishing data reliability groups within a geographically distributed data storage environment.

BACKGROUND

Conventional storage technologies facilitate remote storage and access of data via the cloud. However, as the demand for such storage and access has increased, so too has the risk of storage failures and costs associated with recovering from such failures. Consequently, conventional storage technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
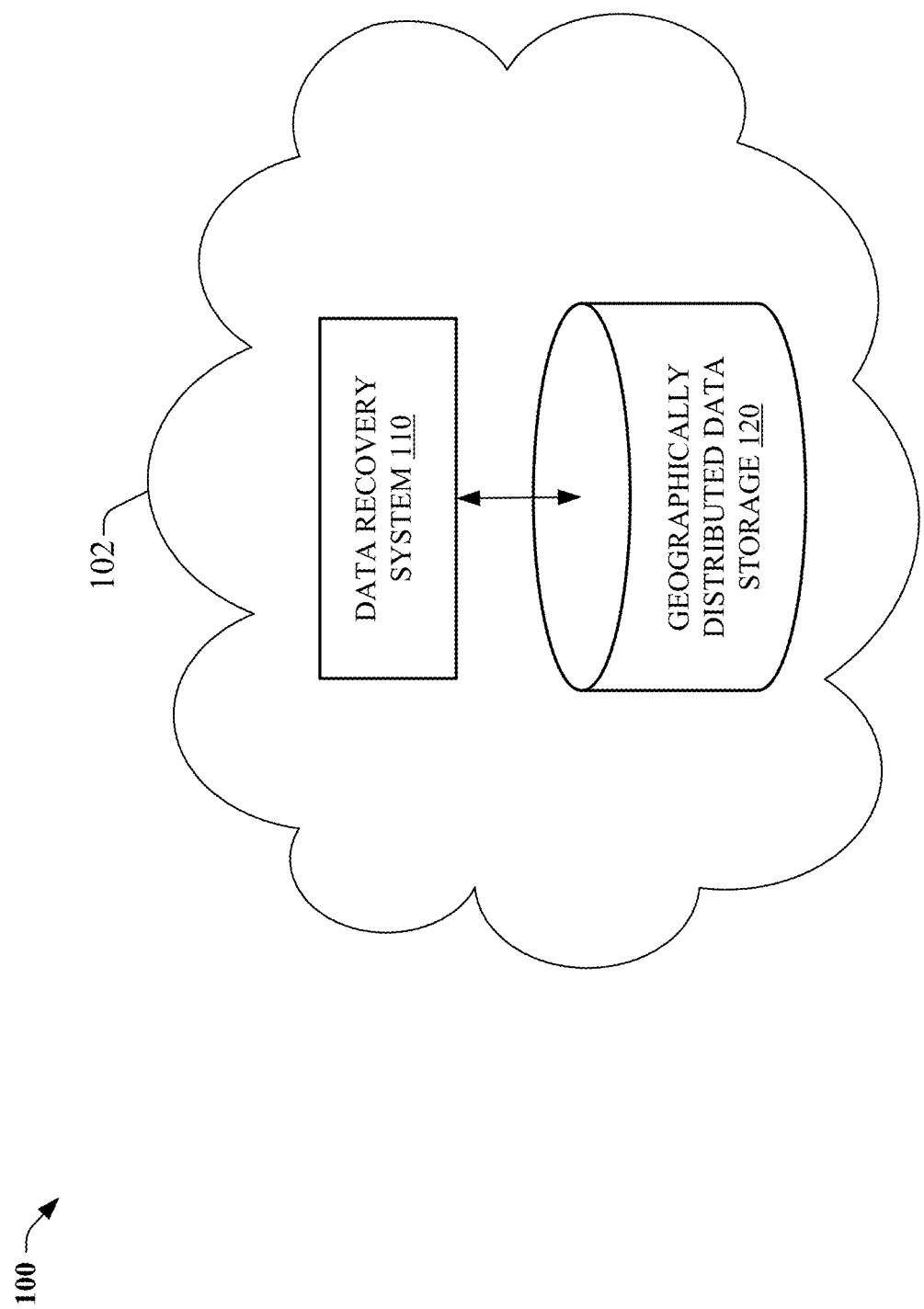
FIG. 1 illustrates a block diagram of a cloud-based storage environment comprising a data recovery system for establishing data reliability groups within geographically distributed data storage, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional storage technologies have had some drawbacks with respect to managing risk of storage failures in a geographically distributed data storage environment and reducing data recovery costs corresponding to such failures. On the other hand, various embodiments disclosed herein can limit risks of multiple data failures associated with an increased amount of geographically distributed data storage, and limit costs associated with data recovery by splitting large clusters of geographically distributed data storage into reliability groups, and restricting replication of data of a reliability group to zones of the reliability group.

For example, a system, e.g., a data recovery system, can comprise a processor, and a memory that stores executable instructions that, when executed by the processor, facilitate performance of operations, comprising: partitioning, dividing, splitting, sorting, etc. geographically distributed data storage zones, clusters, etc. (e.g., within a cloud-based data storage environment) into reliability groups. In this regard, in one embodiment, an equal amount of data storage zones of the geographically distributed data storage zones can be included in each of the reliability groups. In another embodiment, different amounts of data storage zones can be included in respective reliability groups of the reliability groups.

In yet another embodiment, the data recovery system can employ a "clustering" technique to select, from the geographically distributed data storage zones, data storage zones to be included in a reliability group. In this regard, in one embodiment, the data storage zones can be selected for the reliability group based on a defined similarity between the data storage zones, e.g., with respect to a data transfer bandwidth, throughput, etc.

In another embodiment, the data storage zones can be selected for the reliability group according to an "anti-clustering" technique, e.g., based on a defined dissimilarity between the data storage zones, e.g., with respect to a geological condition, hazard, risk, etc. (e.g., earthquake risk, flood risk, hurricane risk, etc.). In yet another embodiment, the data storage zones can be selected for the reliability group based on a defined probability of a single storage failure within the reliability group; a required use efficiency (e.g., defined amount of utilization) of the reliability group, etc.

Further, the operations can comprise facilitating a replication of data of the group of storage zones using a portion of remaining data of the group of storage zones. In this regard, in an embodiment, the facilitating of the replication of the data can comprise restricting the replication of the data outside of the group of storage zones, i.e., allowing, enabling, facilitating, etc. replication of data, user data, etc. inside, within, etc. a single reliability group solely utilizing storage zones belonging to the single reliability group.

In embodiment(s), the data of the group of storage zones can correspond to a source storage zone of the group of storage zones, and the portion of the remaining data of the group of storage zones can correspond to a protection set, e.g., of a target storage zone, for facilitating recovery of the data of the source storage zone.

For example, the protection set can comprise an exclusive-or (XOR) chunk/block that has been generated by performing an XOR operation on a copy of a data chunk/block of the source storage zone and a copy of a data chunk/block of the target storage zone. In an embodiment, data chunks/blocks of the group of storage zones comprise a defined number, e.g., 128 megabytes (MB), of data blocks.

In this regard, in response to determining that the data chunk/block of the source storage zone has been destroyed, removed, lost, erased, etc., the operations can further comprise performing an XOR operation on the XOR chunk/block and the copy of the data chunk/block of the target storage zone to obtain a backup copy of the data chunk/block of the source storage zone.

In one embodiment, a method can comprise: dividing, by a system comprising a processor, geographically distributed data storage zones into data reliability groups, in which a data reliability group of the data reliability groups comprises a group of storage zones comprising a defined number of the geographically distributed data storage zones; and facilitating, by the system, a replication of a storage zone of the group of storage zones using a portion of remaining storage zones of the group of storage zones.

In embodiment(s), the dividing of the geographically distributed data storage zones comprises selecting the defined number of the geographically distributed data storage zones for the data reliability group based on respective rates of data throughput, e.g., bandwidth, corresponding to the defined number of the geographically distributed data storage zones.

In other embodiment(s), the dividing of the geographically distributed data storage zones comprises selecting the defined number of the geographically distributed data storage zones for the data reliability group based on a defined condition with respect to geologically-based hazard(s), e.g., risk of earthquake, risk of flood, risk of hurricane, etc. corresponding to the defined number of the geographically distributed data storage zones.

In yet other embodiment(s), the facilitating of the replication of the data storage zone comprises: creating a first backup copy of a first data chunk of a source storage zone of the group of storage zones in a first target storage zone of the group of storage zones; creating a second backup copy of a second data chunk of the source storage zone in a second target storage zone of the group of storage zones; and creating a third backup copy of a third data chunk of the second target storage zone in the first target storage zone.

Further, the method can comprise performing, by the system, a first XOR operation on the first backup copy of the first data chunk and the third backup copy of the third data chunk to obtain an XOR result; and removing, by the system, the first backup copy and the third backup copy from the first target storage zone.

In turn, in other embodiment(s), the method can comprise: in response to determining that the first data chunk of the source storage zone has been destroyed, removed, lost, erased, etc., performing, by the system, a second XOR operation using the XOR result and the third data chunk to obtain, derive, etc. the first backup copy of the first data chunk.

One embodiment can comprise a computer-readable storage medium comprising instructions that, in response to execution, cause a system comprising a processor to perform operations, comprising: splitting a geographically distributed cluster of storage zones into a defined amount of storage reliability groups, wherein a storage reliability group of the defined amount of storage reliability groups comprises a defined amount of storage zones of the geographically distributed cluster of storage zones; and facilitating replication of a data chunk of a first storage zone of the storage reliability group using data of a second storage zone of the storage reliability group.

In embodiment(s), the splitting of the geographically distributed cluster of storage zones comprises: forming the storage reliability group based on respective communication bandwidths of the defined amount of storage zones.

In other embodiment(s), the splitting of the geographically distributed cluster of storage zones comprises: forming the storage reliability group based on respective geological characteristics corresponding to the defined amount of storage zones.

In one embodiment, the facilitating the replication of the data chunk comprises: preventing replication of data chunks of the storage reliability group using data outside of the storage reliability group.

As described above, conventional network technologies have had some drawbacks with respect to being susceptible to increased risks of storage failures and costs associated with recovering from such failures. For example, assuming that a statistical probability of a failure in a storage system is constant, a probability of a dual, triple, etc. data failure, e.g., loss of data, etc. of a storage group of a storage system increases as a total number of storage groups of the storage system increases. Further, although the storage system can recover lost data of a storage group using remaining storage groups of the storage system, data recovery costs increase as the total number of storage groups increases.

Various embodiments described herein can limit the probability of dual, triple, etc. data failures within a geographically distributed, e.g., cloud-based, storage system by splitting, grouping, dividing, partitioning, etc. a large cluster of data storage zones of the geographically distributed storage system into reliability groups, e.g., preventing single storage, data, etc. failures within different reliability groups from causing a data loss.

Further, the various embodiments described herein can limit the cost of data recovery within the geographically distributed storage system by facilitating replication of data within a single reliability group—using, solely using, etc. storage zones belonging to the single reliability group.

Now referring to FIGS. 1-4, block diagrams of a cloud-based storage environment (100) comprising a data recovery system (110) for establishing data reliability groups within geographically distributed data storage (120); the data recovery system comprising a clustering component and a replication component; zones of data storage within a cloud-based geographically distributed data storage environment (300); and partitioning of the cloud-based geographically distributed data storage environment into data reliability groups comprising respective zones of the zones of data storage are illustrated, respectively, in accordance with various example embodiments.

Clustering component 210 can partition, divide, split, sort, etc. geographically distributed data storage zones, clusters, etc. (301, 302, 303, 304, 305, 306, 307, 308, 309) into reliability groups (410, 420, 430). In this regard, in an embodiment illustrated by FIG. 3, clustering component 210 can partition, divide, split, sort, etc. an equal amount of data storage zones of the geographically distributed data storage zones, clusters, etc. into each of the reliability groups. In another embodiment (not shown), different amounts of data storage zones can be included in respective reliability groups of the reliability groups.

In one embodiment, clustering component 210 can employ a "clustering" technique to select data storage zones from the geographically distributed data storage zones, clusters, etc. to be included in respective reliability groups. In this regard, in one embodiment, clustering component 210 can select data storage zones for a reliability group based on a defined similarity between the data storage zones, e.g., with respect to the data storage zones satisfying a defined condition representing respective distances between the data storage zones being less than or equal to a defined number of miles, kilometers, etc.; with respect to the data storage zones satisfying a defined condition representing respective data transfer bandwidths of the data storage zones being greater than or equal to a defined rate of data transfer, etc. For example, clustering component 210 can select data storage zones that have similar data transfer, bandwidth, etc. capabilities for the reliability group.

Figure 5:
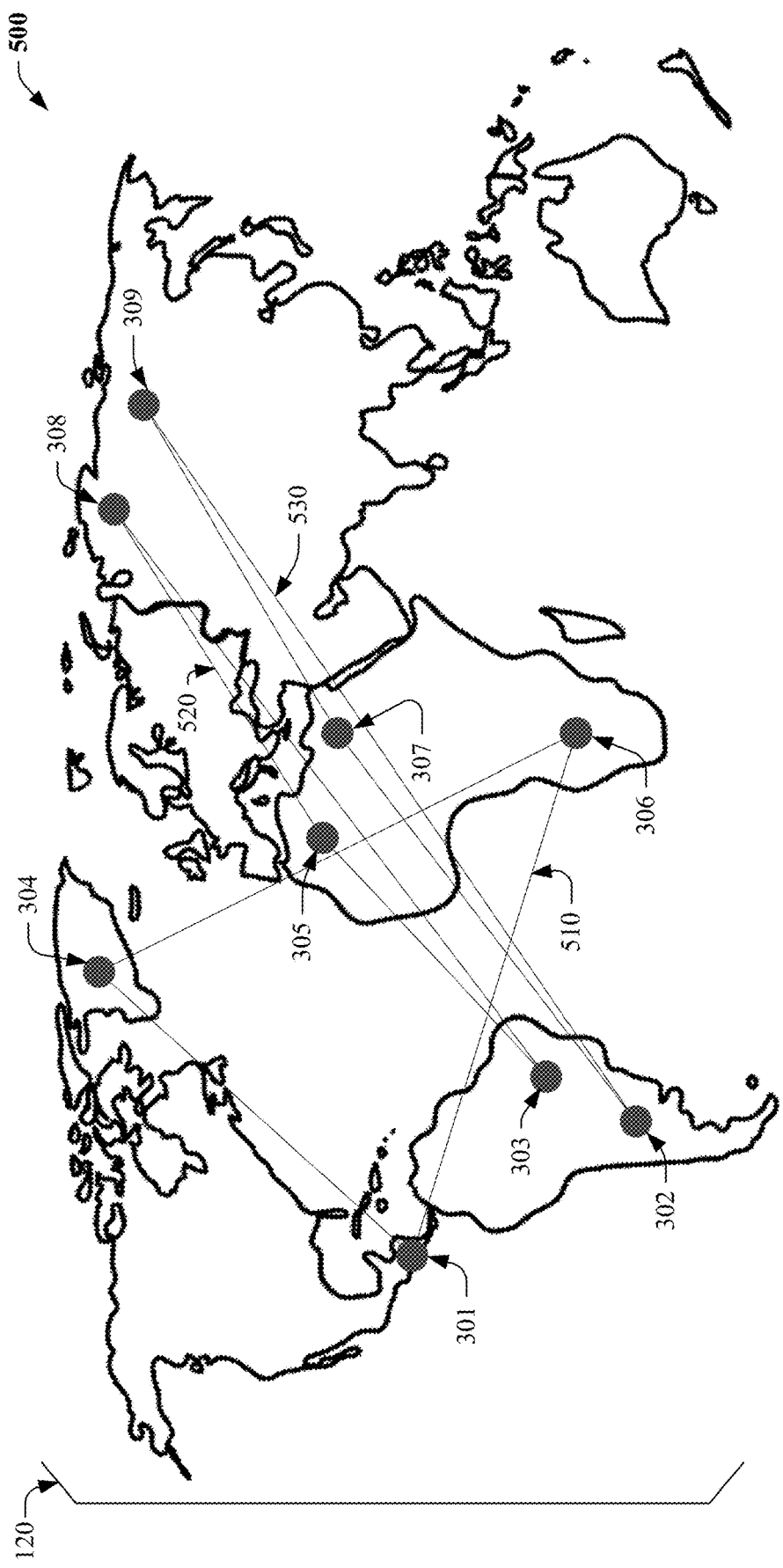
FIG. 5 illustrates another cloud-based geographically distributed data storage environment that that has been partitioned into a defined number of data reliability groups, in accordance with various example environments.

Now referring to another embodiment illustrated by FIG. 5, clustering component 210 can select data storage zones for a reliability group according to an "anti-clustering" technique, e.g., based on a defined dissimilarity between the data storage zones, e.g., with respect to a geological condition, hazard, risk, etc. (e.g., earthquake risk, flood risk, hurricane risk, etc.). In this regard, clustering component 210 can select respective data storage zones for reliability groups 510, 520, and 530 in response to determining that data storage zones of a reliability group satisfy a defined condition representing that the data storage zones are associated with disparate risks of geological hazard, e.g., earthquake, flood, hurricane, etc. For example, as illustrated by FIG. 5, data storage zones 302 and 303 of South America can be included in different reliability groups (520, 530) in response to determinations by clustering component 210 that: data storage zones 302 and 303 are associated with a similar earthquake risk; and data storage zones (305 and 308)/(307 and 309) of reliability group 520/530 are associated with respective earthquake risks different from the similar earthquake risk of data storage zone 303/302.

In yet another embodiment, clustering component 210 can select data storage zones for a reliability group based on a defined probability of a single storage failure within the reliability group; a required use efficiency (e.g., defined amount of utilization) of the reliability group, etc.

Figure 2:
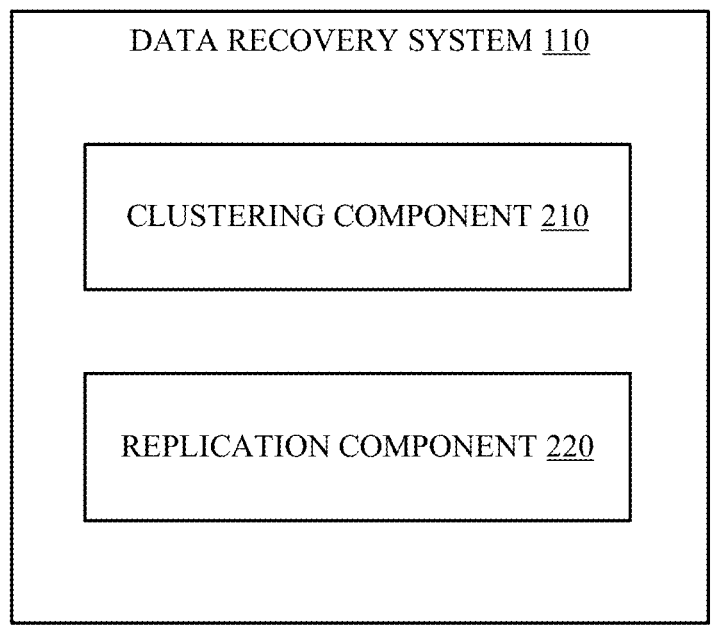
FIG. 2 illustrates a block diagram of a data recovery system, in accordance with various example embodiments.
Figure 3:
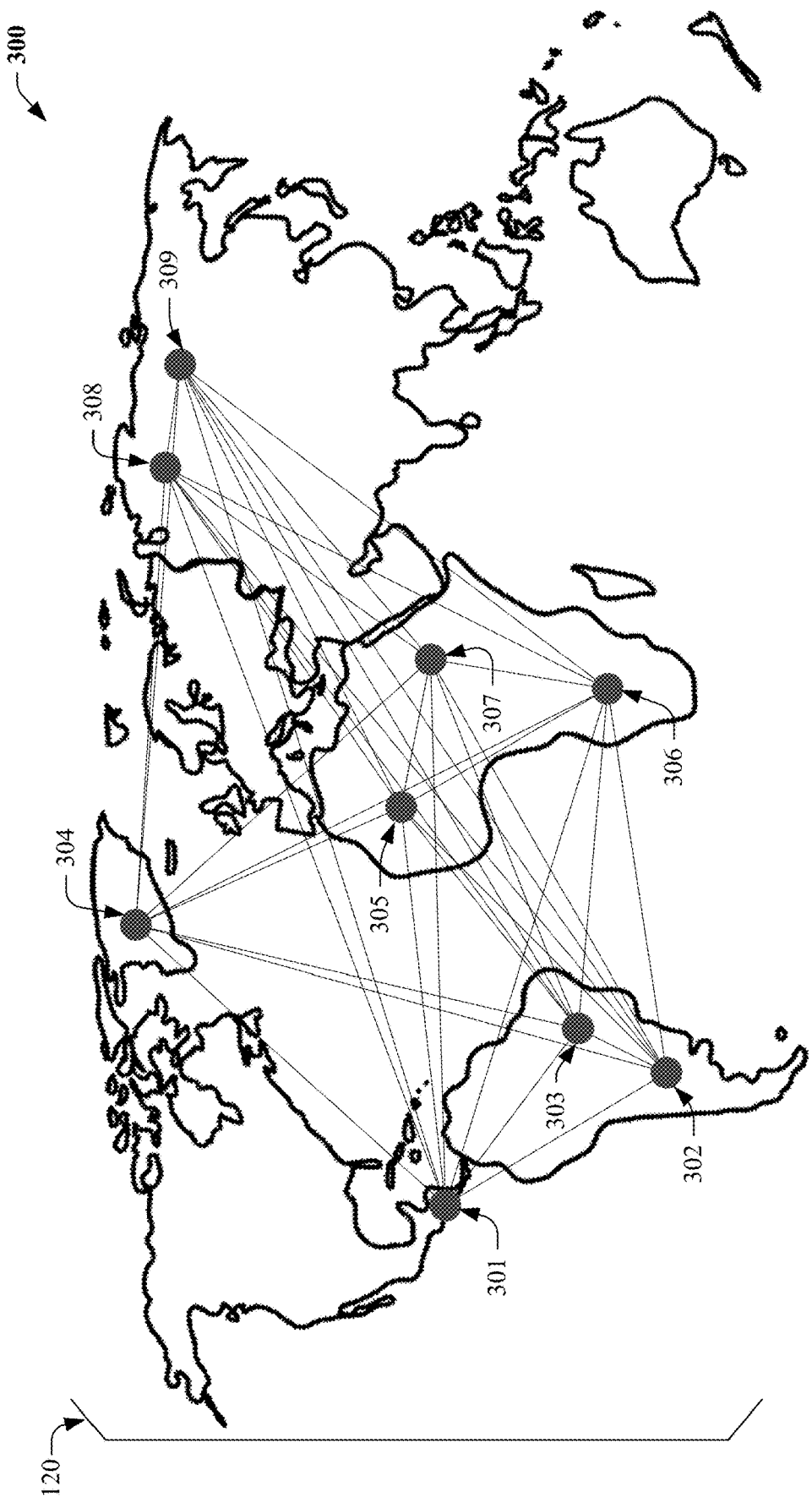
FIG. 3 illustrates a block diagram of zones of data storage within a cloud-based geographically distributed data storage environment, in accordance with various example embodiments.
Figure 4:
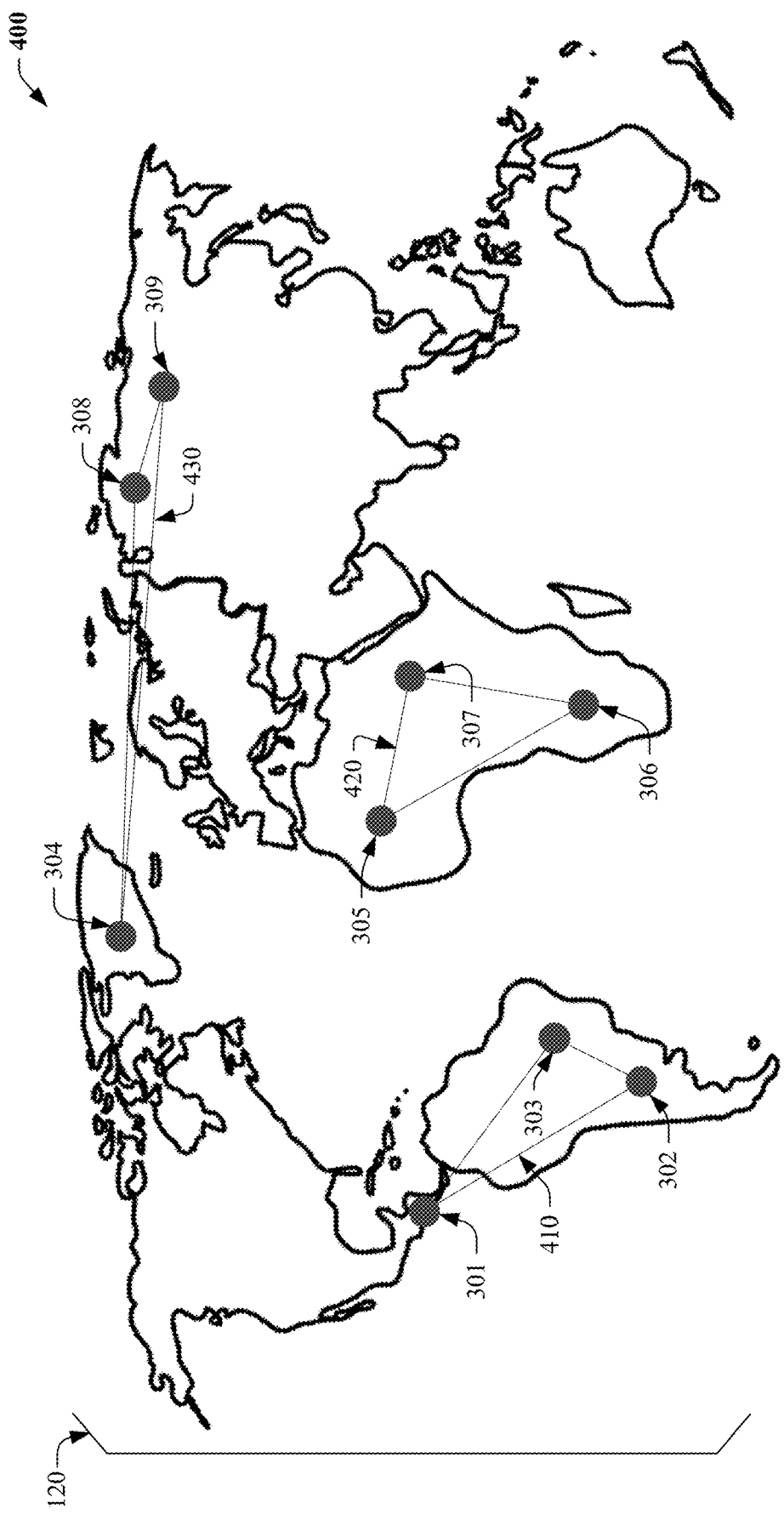
FIG. 4 illustrates a cloud-based geographically distributed data storage environment that has been partitioned into data reliability groups comprising zones of data storage, in accordance with various example embodiments.

Referring now to FIG. 2, replication component 220 can facilitate a replication of data of a group of storage zones of a reliability group using a portion of remaining data of the group of storage zones of the reliability group. In this regard, in an embodiment, replication component 220 can facilitate the replication of the data by restricting replication of the data outside of the group of storage zones of the reliability group, i.e., allowing, enabling, facilitating, etc. replication of the data within the reliability group solely utilizing storage zones belonging to the reliability group.

Figure 6:
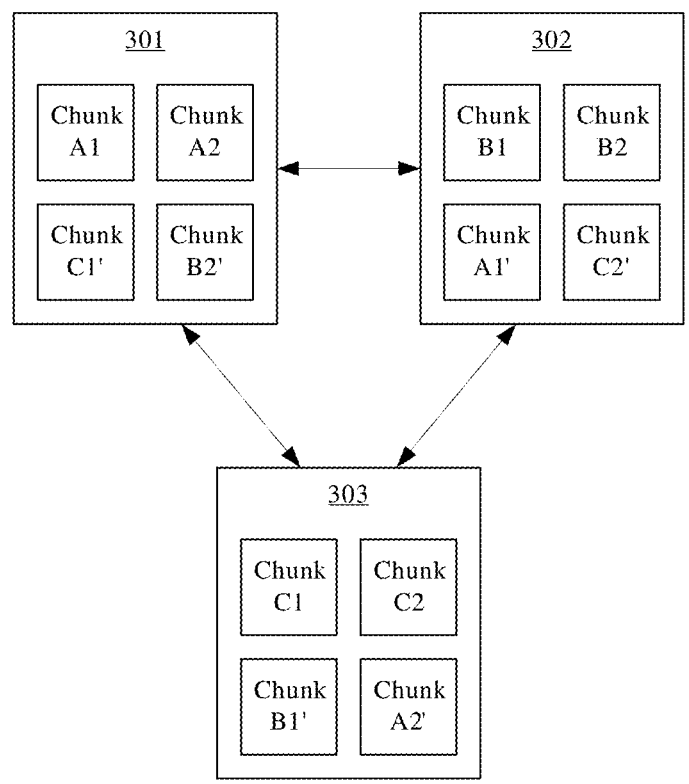
FIGS. 6-8 illustrate zones of data storage of a data reliability group during data backup of the data storage, in accordance with various example embodiments.
Figure 7:
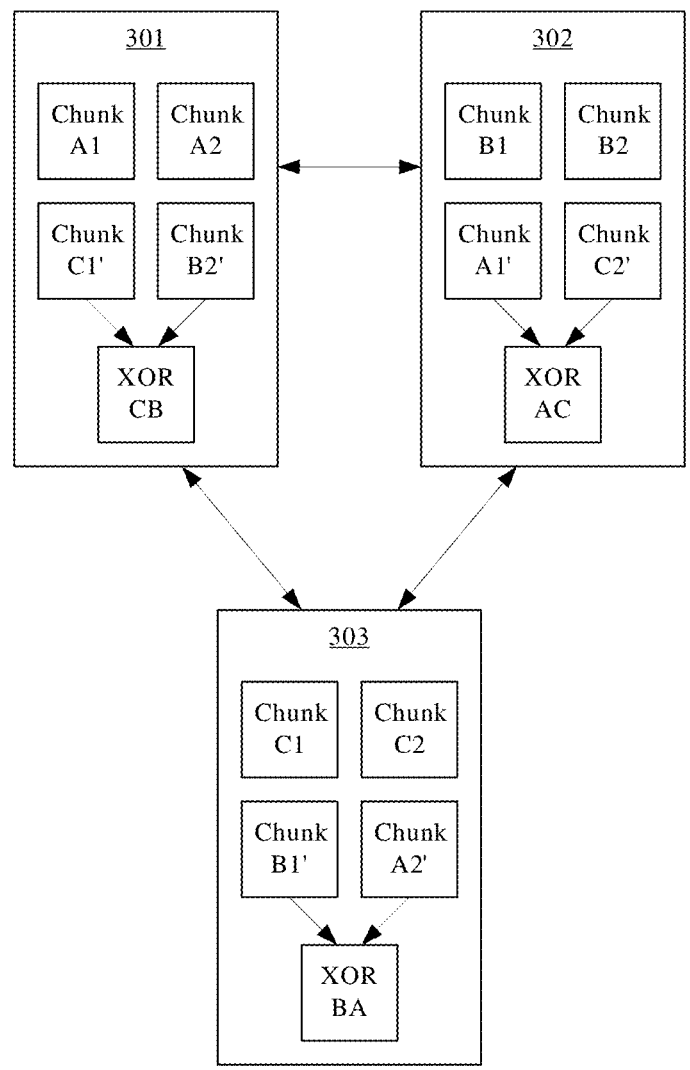
Figure 8:
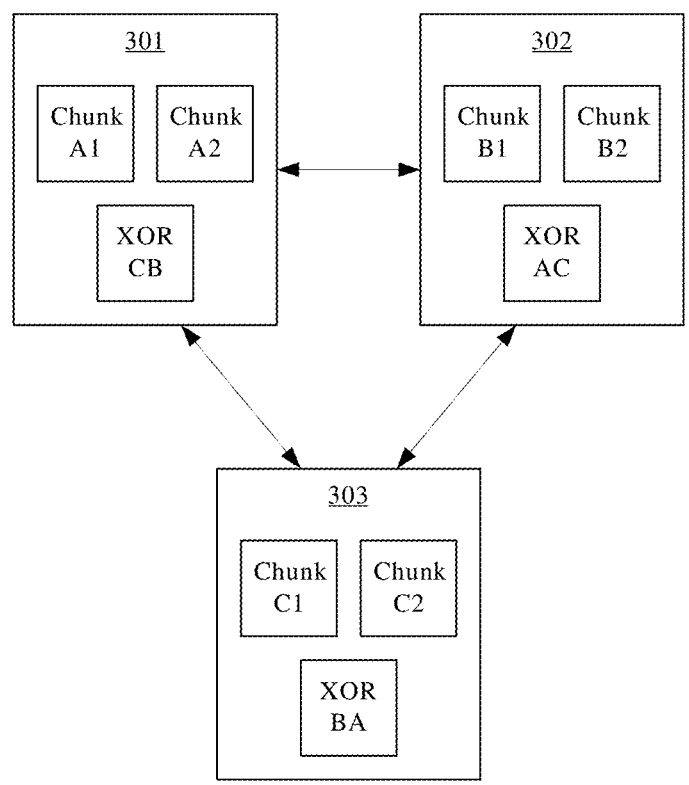

In this regard, and now referring to FIGS. 6-8, zones of data storage of a data reliability group during stages of data backup of the zones of data storage are illustrated, in accordance with various example embodiments. Initially, each data storage zone (301, 302, 303) of reliability group 410 comprises two data chunks/blocks ("Chunk A1" and "Chunk A2" of data storage zone 301; "Chunk B1 and "Chunk B2" of data storage zone 302; and "Chunk C1" and "Chunk C2" of data storage zone 303). In an embodiment, a data chunk/block comprises 128 MB.

As illustrated by FIG. 6, replication component 220 can create, store, etc. a backup copy of respective data chunks/blocks of each data storage zone of reliability group 410 in other data storage zones of reliability group 410. In an embodiment, each data storage zone of reliability group 410 can communicate, transfer data, etc. with each other, and replication component can facilitate, initiate, etc. such communication, data transfer, etc. to perform operations, e.g., data storage/retrieval, XOR operations, etc. described herein.

In the embodiment illustrated by FIG. 6, replication component 220 stores a first data chunk/block of each data storage zone in an other data storage zone in a clockwise manner. Further, replication component 220 stores a second data chunk/block of each data storage zone in the other data storage zone in a counterclockwise manner. In other embodiment(s), such replication is performed in an opposite, e.g., counterclockwise and clockwise, manner.

Referring now to FIG. 7, replication component 220 can derive, or facilitate derivation by respective data storage zones, an XOR chunk/block for each storage zone. In this regard, the XOR chunk/block is obtained by performing an XOR operation on the data chunks/blocks that have been copied, stored, etc. in the storage zone, e.g., XOR CB=Chunk C1' ⊕Chunk B2'. In embodiment(s), a protection set of the storage zone comprises the XOR chunk/block and the data chunks/blocks that were used to generate, derive, etc. the XOR chunk/block. As illustrated by FIG. 8, after the XOR chunk/block has been created, replication component 220, or the respective data storage zones, can delete the data chunks/blocks that were used to generate the XOR chunk/block.

Figure 9:
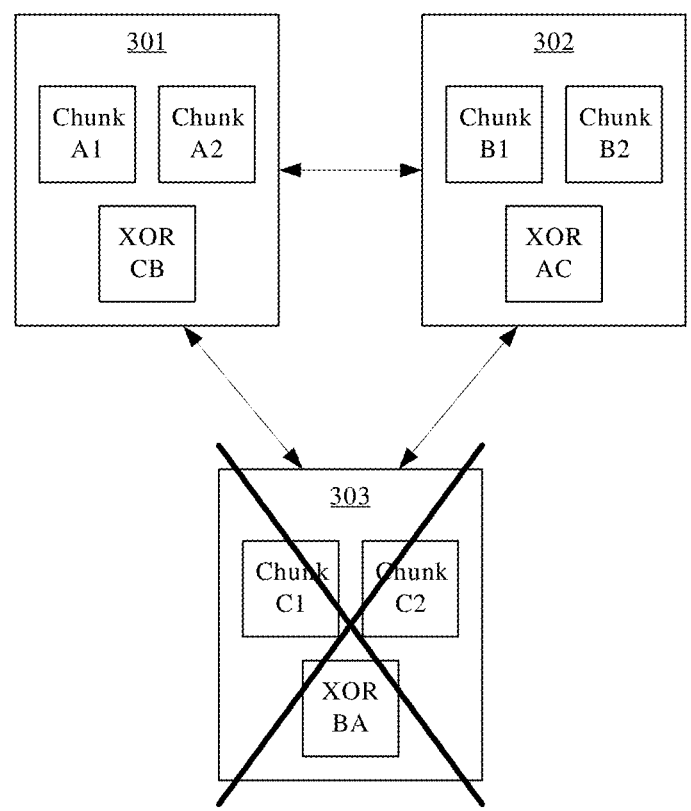
FIGS. 9-12 illustrate zones of data storage of a data reliability group during data recovery of the data storage, in accordance with various example embodiments.
Figure 10:
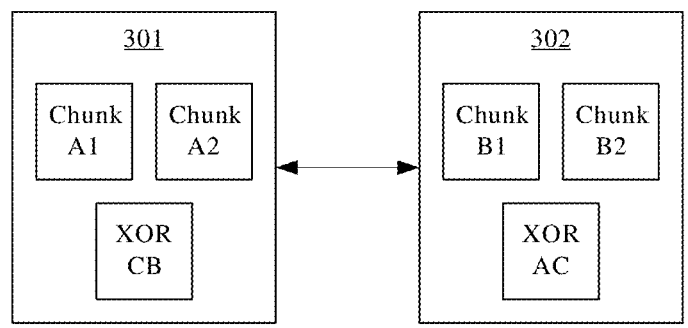
Figure 10:
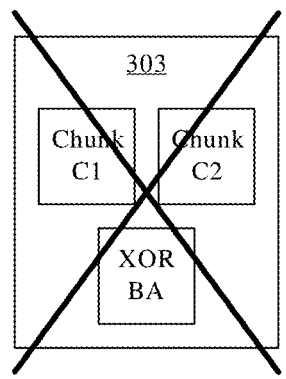

Now referring to FIGS. 9-12, zones of data storage of a data reliability group during stages of data recovery of the data storage are illustrated, in accordance with various example embodiments. As illustrated by FIG. 9, replication component 220, and/or data storage zone 301 and/or data storage zone 302, can determine a failure, e.g., comprising a loss of data, of data storage zone 303. In turn, in an embodiment illustrated by FIG. 10, data storage zones 301 and 302 can cease communications with data storage zone 303. Further, replication component 220 can initiate recovery, e.g., via data storage zoned 301 and 302, of the data chunks/blocks of data storage zone 303.

Figure 11:
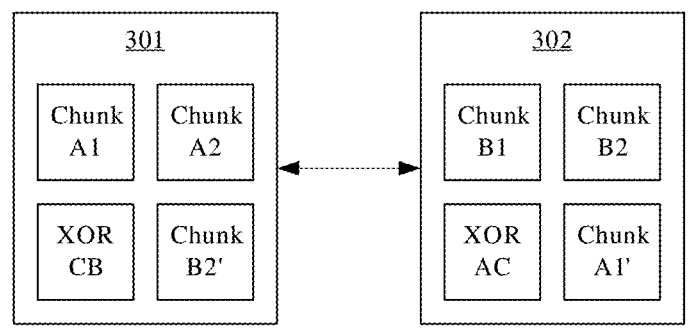
Figure 11:
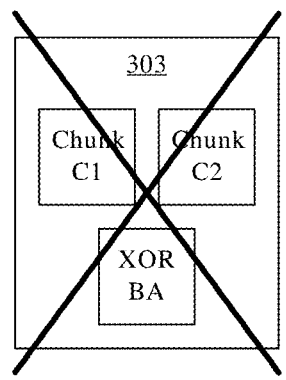

In this regard, as illustrated by FIG. 11, replication component 220 can facilitate, initiate, etc. retrieval of copies of data chunks/blocks, which were used to generate respective XOR chunks/blocks of data storage zones 301 and 302, into data storage zones 301 and 302, e.g., retrieving a copy of Chunk B2/Chunk A1 into data storage zone 301/302.

Figure 12:
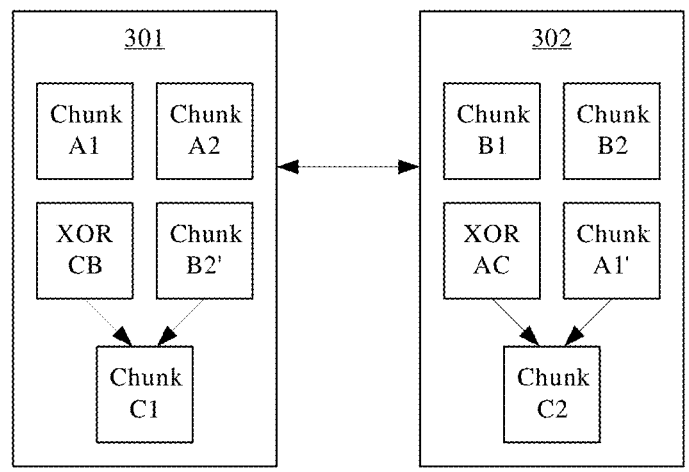
Figure 12:
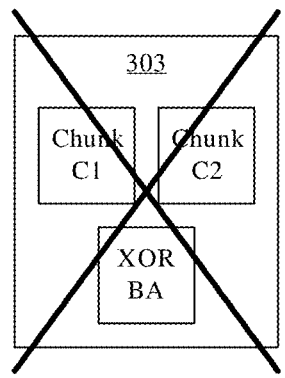

In turn, as illustrated by FIG. 12, replication component 220 can facilitate, initiate, etc. restoration of the data chunks/blocks of data storage zone 303. In this regard, replication component 220, and/or data storage zones 301/302, can perform XOR operations on respective XOR chunks/blocks of data storage zones 301/302, and respective copies of the data chunks/blocks that were used to generate the respective XOR chunks/blocks, to derive, obtain, restore a copy, backup copy, etc. of the data chunks/blocks of data storage zone 303. In this regard, the XOR operation to derive Chunk C1=XOR CB C⊕a Chunk B2', and the XOR operation to derive Chunk C2=XOR AC⊕Chunk A1'.

Figure 13:
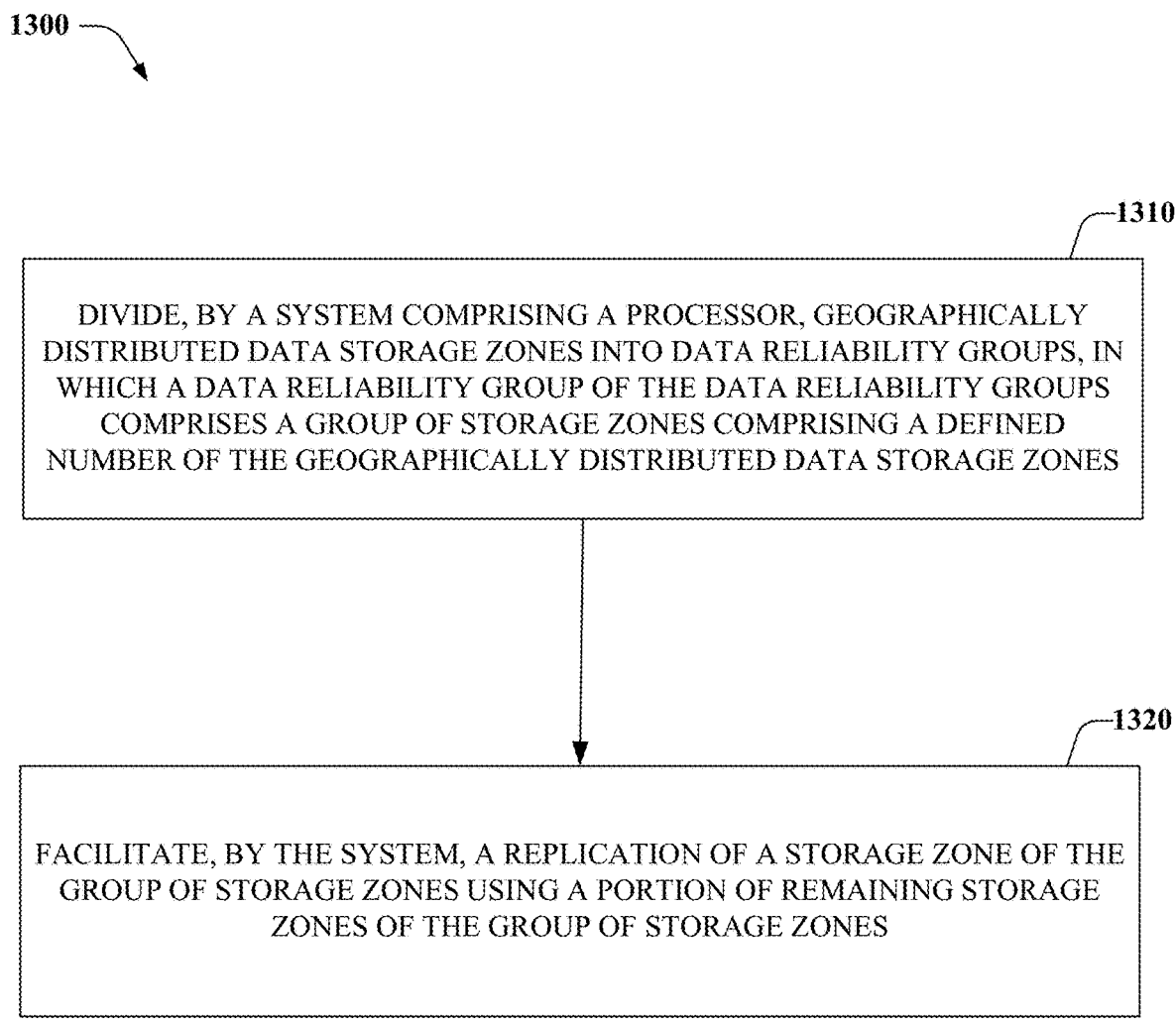
FIG. 13 illustrates a flow chart of a method associated with establishing data reliability groups within a geographically distributed data storage environment, in accordance with various example embodiments.
Figure 14:
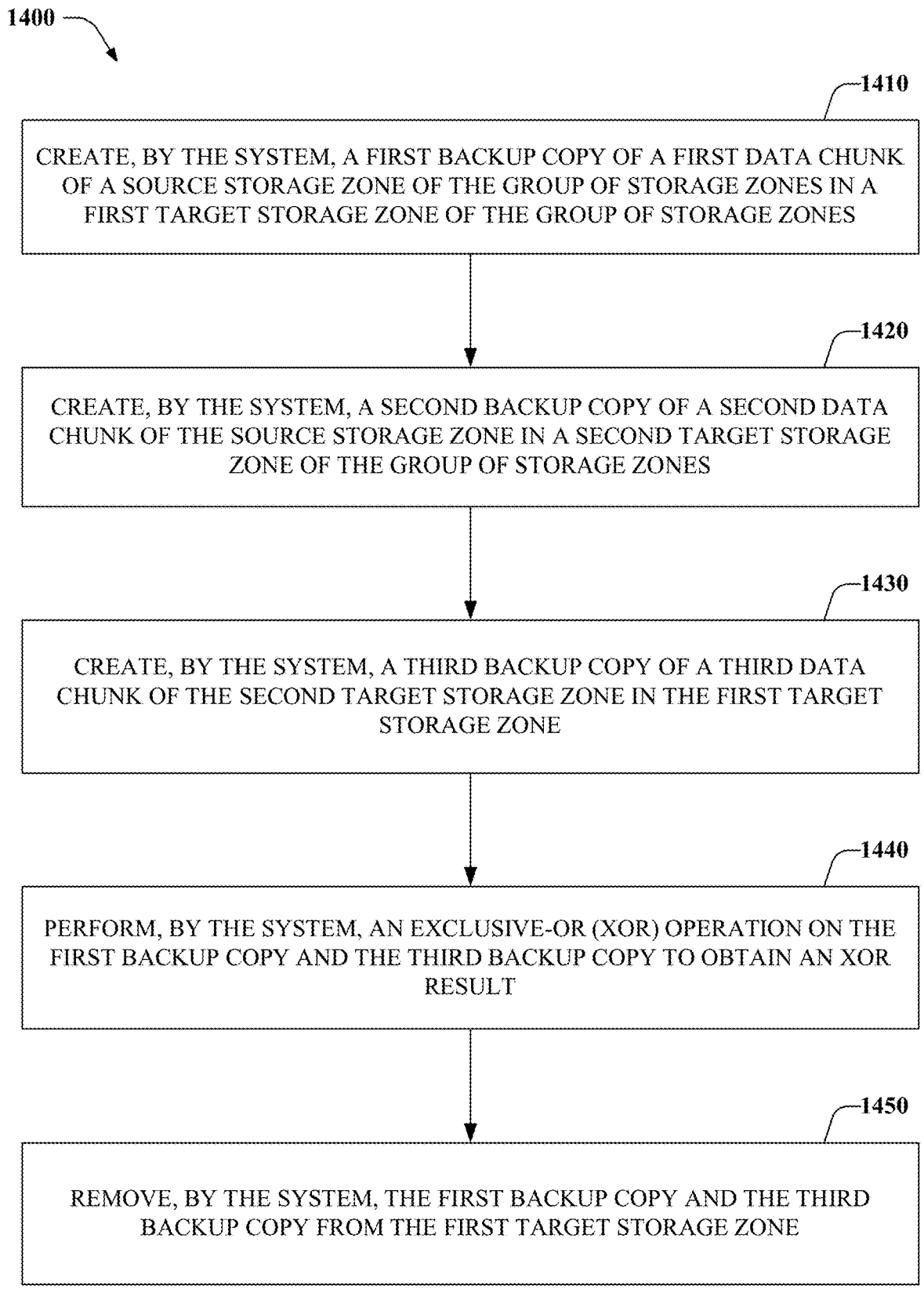
FIG. 14 illustrates a flowchart of a method for performing data backup of a zone of data storage, in accordance with various example embodiments.
Figure 15:
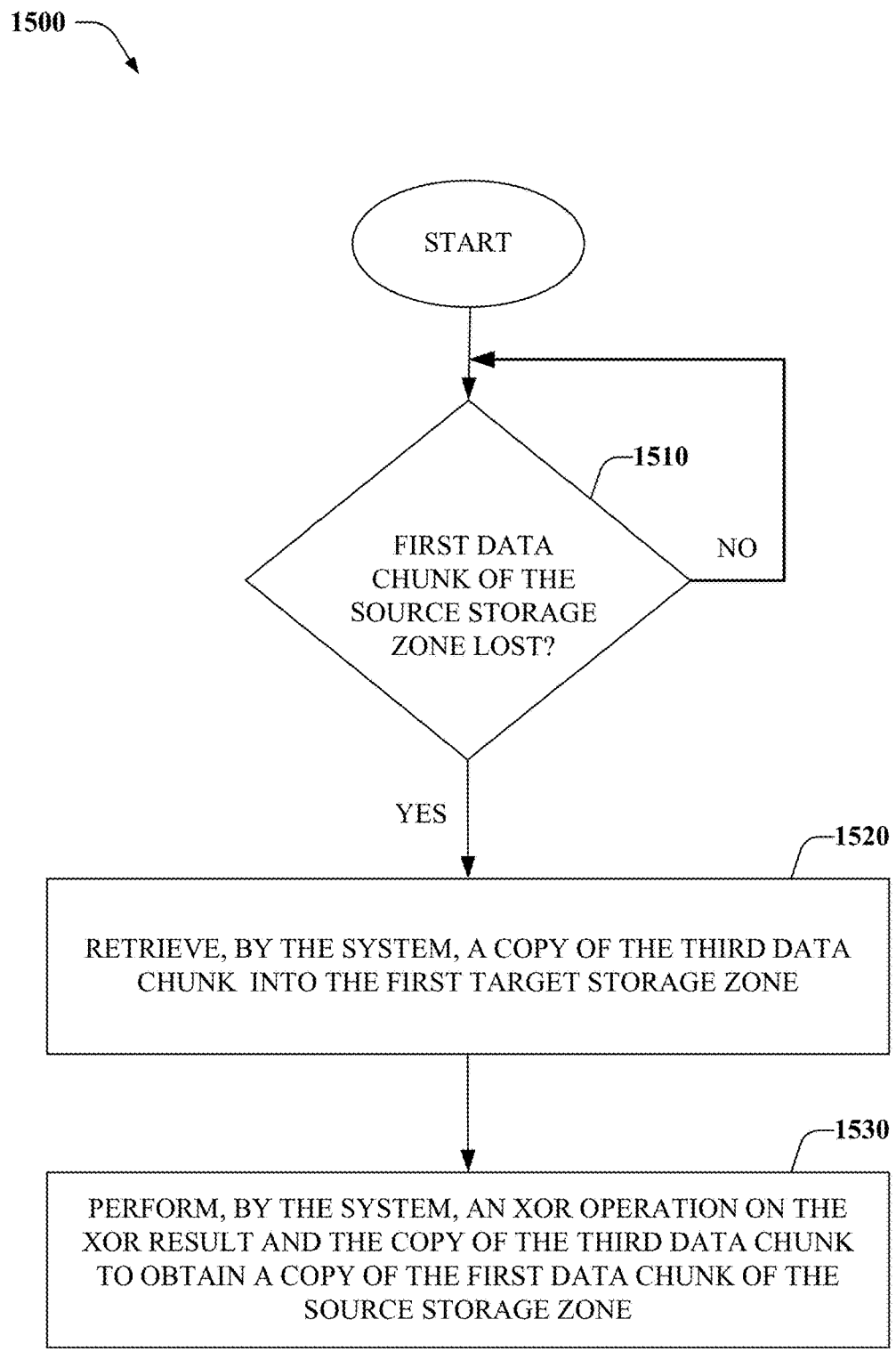
FIG. 15 illustrates a flowchart of a method for performing data recovery of the zone of data storage, in accordance with various example embodiments.

FIGS. 13-15 illustrate methodologies for performing operations corresponding to data recovery system 110, in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 13 illustrates a flow chart (1300) of a method associated with establishing data reliability groups within a geographically distributed data storage environment, in accordance with various example embodiments. At 1310, a system comprising a processor, e.g., data recovery system 110, can divide, partition, split, etc. geographically distributed data storage zones, e.g., within a cloud-based data storage environment, into data reliability groups—a data reliability group of the data reliability groups comprising a group of storage zones comprising a defined number of the geographically distributed data storage zones. At 1320, the system can facilitate a replication of a storage zone of the group of storage zones using a portion of remaining storage zones of the group of storage zones.

In embodiment(s), the system can divide, partition, split, etc. the geographically distributed data storage zones by selecting the defined number of the geographically distributed data storage zones for the data reliability group based on respective rates, e.g., similar (e.g., within 10%), of data throughput, e.g., bandwidth, corresponding to the defined number of the geographically distributed data storage zones.

In other embodiment(s), the system can divide, partition, split, etc. the geographically distributed data storage zones by selecting the defined number of the geographically distributed data storage zones for the data reliability group based on a defined condition with respect to geologically-based hazard(s), e.g., risk of earthquake, risk of flood, risk of hurricane, etc. corresponding to the defined number of the geographically distributed data storage zones.

Referring now to FIG. 14, a flowchart (1400) of a method for performing data backup of a zone of data storage is illustrated, in accordance with various example embodiments. At 1410, the system, i.e., corresponding to FIG. 13, can create a first backup copy of a first data chunk of a source storage zone of the group of storage zones in a first target storage zone of the group of storage zones. At 1420, the system can create a second backup copy of a second data chunk of the source storage zone in a second target storage zone of the group of storage zones.

At 1430, the system can create a third backup copy of a third data chunk of the second target storage zone in the first target storage zone. At 1440, the system can perform an XOR operation on the first backup copy and the third backup copy to obtain an XOR result. At 1450, the system can remove the first backup copy and the third backup copy from the first target storage zone.

Now referring to FIG. 15, a flowchart (1500) of a method for performing data recovery of the zone of data storage corresponding to FIG. 14 is illustrated, in accordance with various example embodiments. At 1510, it can be determined whether the first data chunk of the source storage zone has been lost. In this regard, in response to a determination that the first data chunk of the source storage zone has been lost, flow continues to 1520, at which the system can retrieve a copy of the third data chunk into the first target storage zone; otherwise flow returns to 1510. At 1530, the system can perform an XOR operation on the XOR result and the copy of the third data chunk to obtain a copy of the first data chunk of the source storage zone.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "system," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via data recovery system 110, to partition geographically distributed storage zones into reliability groups, facilitate a replication of data of a storage zone of a reliability group of the reliability groups using a portion of remaining data of the storage zone, etc. as described herein.

A classifier can be a function that maps an input attribute vector, $x=(x1, x2, x3, x4, xn)$, to a confidence that the input belongs to a class, that is, $f(x)=$confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by data recovery system 110.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "socket", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in data recovery system 110, geographically distributed data storage 120, non-volatile memory 1622 (see below), disk storage 1624 (see below), and/or memory storage 1646 (see below). Further, nonvolatile memory can be included in read only memory (ROM), programmable ROM (PROM), electrically programmable ROM (EPROM), electrically erasable ROM (EEPROM), or flash memory. Volatile memory 1620 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 16:
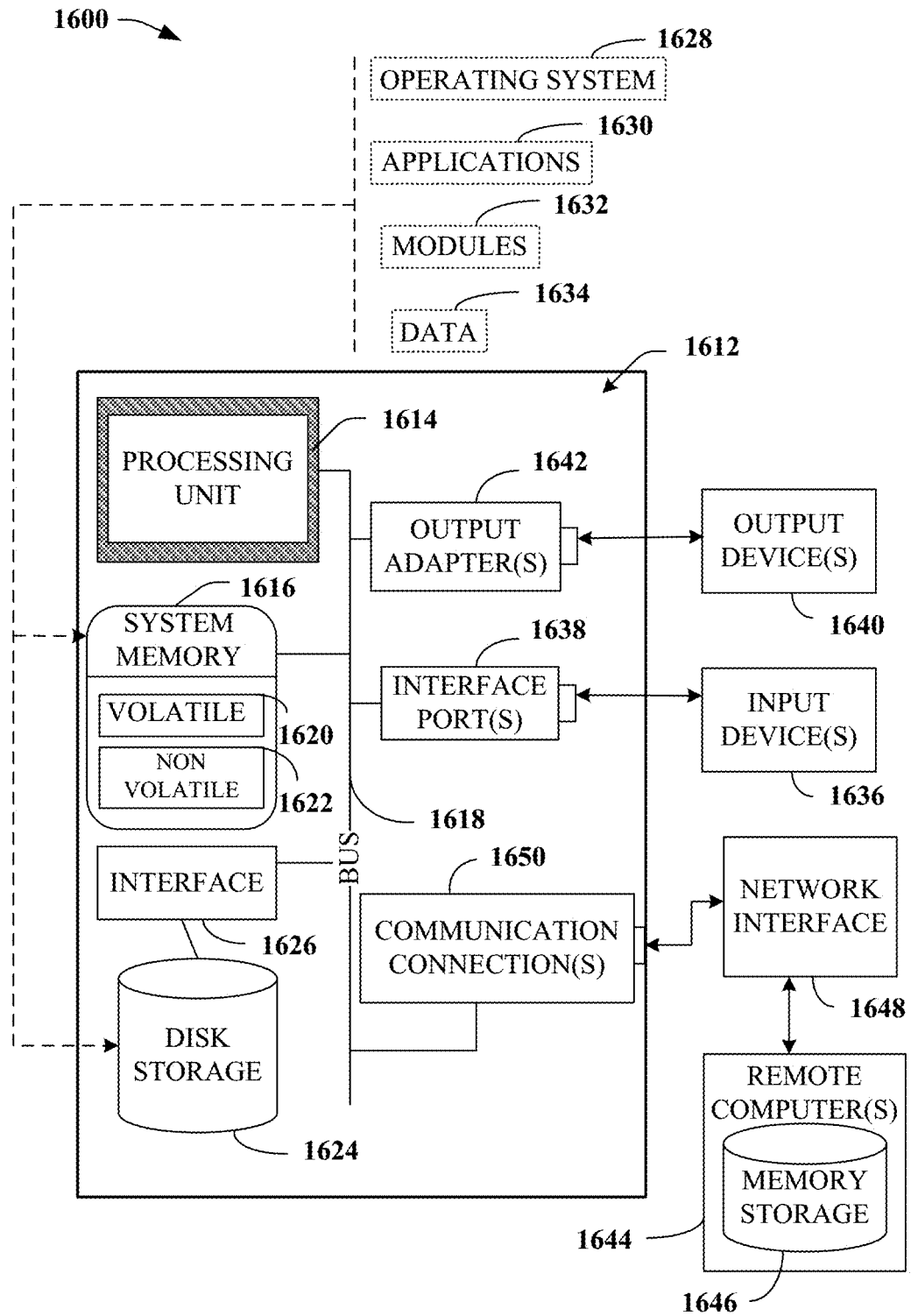
FIG. 16 illustrates a block diagram representing an illustrative non-limiting computing system or operating environment in which one or more aspects of various embodiments described herein can be implemented.

In order to provide a context for the various aspects of the disclosed subject matter, FIG. 16, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 16, a block diagram of a computing system 1600, e.g., data recovery system 110, operable to execute the disclosed systems and methods is illustrated, in accordance with an embodiment. Computer 1612 comprises a processing unit 1614, a system memory 1616, and a system bus 1618. System bus 1618 couples system components comprising, but not limited to, system memory 1616 to processing unit 1614. Processing unit 1614 can be any of various available processors. Dual microprocessors and other multiprocessor architectures also can be employed as processing unit 1614.

System bus 1618 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1616 comprises volatile memory 1620 and nonvolatile memory 1622. A basic input/output system (BIOS), containing routines to transfer information between elements within computer 1612, such as during start-up, can be stored in nonvolatile memory 1622. By way of illustration, and not limitation, nonvolatile memory 1622 can comprise ROM, PROM, EPROM, EEPROM, or flash memory. Volatile memory 1620 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1612 also comprises removable/non-removable, volatile/non-volatile computer storage media. FIG. 16 illustrates, for example, disk storage 1624. Disk storage 1624 comprises, but is not limited to, devices like a magnetic disk drive, floppy disk drive, tape drive, Jaz drive, Zip drive, LS-100 drive, flash memory card, or memory stick. In addition, disk storage 1624 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to system bus 1618, a removable or non-removable interface is typically used, such as interface 1626.

It is to be appreciated that FIG. 16 describes software that acts as an intermediary between users and computer resources described in suitable operating environment 1600. Such software comprises an operating system 1628. Operating system 1628, which can be stored on disk storage 1624, acts to control and allocate resources of computer system 1612. System applications 1630 take advantage of the management of resources by operating system 1628 through program modules 1632 and program data 1634 stored either in system memory 1616 or on disk storage 1624. It is to be appreciated that the disclosed subject matter can be implemented with various operating systems or combinations of operating systems.

A user can enter commands or information into computer 1612 through input device(s) 1636. Input devices 1636 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1614 through system bus 1618 via interface port(s) 1638. Interface port(s) 1638 comprise, for example, a serial port, a parallel port, a game port, a universal serial bus (USB), a wireless based port, e.g., Wi-Fi, Bluetooth, etc. Output device(s) 1640 use some of the same type of ports as input device(s) 1636.

Thus, for example, a USB port can be used to provide input to computer 1612 and to output information from computer 1612 to an output device 1640. Output adapter 1642 is provided to illustrate that there are some output devices 1640, like display devices, light projection devices, monitors, speakers, and printers, among other output devices 1640, which use special adapters. Output adapters 1642 comprise, by way of illustration and not limitation, video and sound devices, cards, etc. that provide means of connection between output device 1640 and system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. Remote computer(s) 1644 can be a personal computer, a server, a router, a network PC, a workstation, a microprocessor based appliance, a peer device, or other common network node and the like, and typically comprises many or all of the elements described relative to computer 1612.

For purposes of brevity, only a memory storage device 1646 is illustrated with remote computer(s) 1644. Remote computer(s) 1644 is logically connected to computer 1612 through a network interface 1648 and then physically and/or wirelessly connected via communication connection 1650. Network interface 1648 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1650 refer(s) to hardware/software employed to connect network interface 1648 to bus 1618. While communication connection 1650 is shown for illustrative clarity inside computer 1612, it can also be external to computer 1612. The hardware/software for connection to network interface 1648 can comprise, for example, internal and external technologies such as modems, comprising regular telephone grade modems, cable modems and DSL modems, wireless modems, ISDN adapters, and Ethernet cards.

The computer 1612 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1612 can connect to other devices/networks by way of antenna, port, network interface adaptor, wireless access point, modem, and/or the like.

The computer 1612 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations, comprising:
     partitioning geographically distributed data storage zones into reliability groups, wherein a reliability group of the reliability groups comprises a group of storage zones comprising a defined amount of the geographically distributed data storage zones; and
     facilitating a replication of first storage zone data of a first storage zone of the group of storage zones using second storage zone data of a second storage zone of the group of storage zones and an exclusive-or (XOR) result that has been stored in a third storage zone of the group of storage zones, wherein the XOR result comprises an output of an XOR operation that has been performed on the first storage zone data and the second storage zone data.

2. The system of claim 1, wherein the partitioning comprises:
   partitioning the group of storage zones into the reliability group based on a defined similarity between the group of storage zones with respect to a data transfer bandwidth.

3. The system of claim 1, wherein the partitioning comprises:
   partitioning the group of storage zones into the reliability group based on a defined dissimilarity between the group of storage zones with respect to a geological condition.

4. The system of claim 1, wherein the partitioning comprises:
   selecting the defined amount of the geographically distributed data storage zones for the reliability group based on at least one of a defined probability of a single storage failure within the reliability group or a defined use efficiency of the reliability group.

5. The system of claim 1, wherein the facilitating the replication comprises:
   restricting the replication of data outside of the group of storage zones.

6. The system of claim 5, wherein the second storage zone comprises a first protection set, and wherein the third storage zone of the group of storage zones comprises a second protection set.

7. The system of claim 6, wherein the XOR result is a first XOR result, wherein the XOR operation is a first XOR operation, wherein the first protection set comprises a second XOR result of a second XOR operation that has been performed on third storage zone data of the third storage zone and fourth storage zone data of the first storage zone, and wherein the second protection set comprises the first XOR result.

8. The system of claim 7, wherein a data chunk of the group of storage zones comprises a defined number of data blocks.

9. The system of claim 8, wherein the defined number is 128 megabytes.

10. The system of claim 7, wherein the operations further comprise:
    replicating, via a third XOR operation, the first storage zone data utilizing the first XOR result and the second storage zone data; and
    replicating, via a fourth XOR operation, the third storage zone data utilizing the second XOR result and the fourth storage zone data.

11. A method, comprising:
    partitioning, by a system comprising a processor, geographically distributed data storage zones into reliability groups comprising respective groups of storage zones comprising respective defined amounts of the geographically distributed data storage zones; and
    in response to generating a protection set comprising a result of an exclusive-or (XOR) operation that has been performed on first data of a first storage zone of the respective groups of storage zones and second data of a second storage zone of the respective groups of storage zones, facilitating, by the system, a replication of the first data of the first storage zone utilizing the protection set and a copy of the second data of the second storage zone, wherein the result of the XOR operation has been stored in a third storage zone of the respective groups of storage zones.

12. The method of claim 11, wherein the partitioning comprises:
    partitioning a group of storage zones of the respective groups of storage zones into a reliability group of the reliability groups based on a defined similarity between the group of storage zones with respect to a data transfer bandwidth.

13. The method of claim 11, wherein the partitioning comprises:
    partitioning a group of storage zones of the respective groups of storage zones into a reliability group of the reliability groups based on a defined dissimilarity between the group of storage zones with respect to a geological condition.

14. The method of claim 11, wherein the partitioning comprises:
    selecting the respective defined amounts of the geographically distributed data storage zones for a reliability group of the reliability groups based on at least one of a defined probability of a single storage failure within the reliability group or a defined use efficiency of the reliability group.

15. The method of claim 11, wherein the protection set is a first protection set, wherein the XOR operation is a first XOR operation, wherein the result is a first result, and wherein a second protection set comprises a second XOR result of a second XOR operation that has been performed on third data of the third storage zone of the respective groups of storage zones and fourth data of the first storage zone.

16. The method of claim 15, wherein the operations further comprise:
    replicating, by the system via a third XOR operation, the first data utilizing the first protection set; and
    replicating, by the system via a fourth XOR operation, the third data utilizing the second protection set.

17. A computer-readable storage medium comprising instructions that, in response to execution, cause a system comprising a processor to perform operations, comprising:
    splitting a geographically distributed cluster of storage zones into storage reliability groups, wherein a storage reliability group of the storage reliability groups comprises a defined amount of storage zones of the geographically distributed cluster of storage zones; and facilitating replication of first data of a first storage zone of the defined amount of storage zones using second data of a second storage zone of the defined amount of storage zones and a result of an exclusive-or operation that has been performed on the first data and the second data and that has been stored in a third storage zone of the defined amount of storage zones.

18. The computer-readable storage medium of claim 17, wherein the splitting comprises:

forming the storage reliability group based on respective communication bandwidths of the defined amount of storage zones.

19. The computer-readable storage medium of claim 17, wherein the splitting comprises:

forming the storage reliability group based on respective geological characteristics corresponding to the defined amount of storage zones.

20. The computer-readable storage medium of claim 17, wherein the facilitating comprises:

preventing replication of data chunks of the storage reliability group using data outside of the storage reliability group.

* * * * *